United States Patent [19]
Jeong et al.

[11] Patent Number: 5,144,575
[45] Date of Patent: Sep. 1, 1992

[54] HIGH SPEED FLOATING POINT TYPE MULTIPLIER CIRCUIT

[75] Inventors: Ho-sun Jeong; Sang-jin Lee, both of Taegu, Rep. of Korea

[73] Assignee: Samsung Electronics Co., Ltd., Kyunggi, Rep. of Korea

[21] Appl. No.: 617,029

[22] Filed: Nov. 21, 1990

[30] Foreign Application Priority Data

Apr. 19, 1990 [KR] Rep. of Korea .................. 90-5491

[51] Int. Cl.⁵ .............................................. G06F 7/38
[52] U.S. Cl. .................................................... 364/748
[58] Field of Search ... 364/748, 754, 807, 900 MS File

[56] References Cited
U.S. PATENT DOCUMENTS
4,941,122 7/1990 Weideman .................. 364/807

Primary Examiner—Long T. Nguyen
Attorney, Agent, or Firm—Cushman, Darby & Cushman

[57] ABSTRACT

A floating point multiplier circuit for multiplying two binary numbers includes a multiplier, a binary point processing device, a first network adder/subtracter, a second adder/subtracter, and a control device. In the floating point multiplier circuit, the circuit for operating the exponent and mantissa is designed using a parallel arrangement of PMOS and NMOS transistors. Faster operation is realized by transmitting in parallel a given input and a resulting output. Furthermore, the structure is much simpler than configurations using conventional logic gates thereby resulting in reduced chip area and efficient use of VLSI design methodologies.

8 Claims, 9 Drawing Sheets

HIGH SPEED FLOATING POINT TYPE MULTIPLIER CIRCUIT

FIELD OF THE INVENTION

The present invention relates to a multiplier circuit, and, more particularly, a high-speed floating point type multiplier circuit using a neural network to improve processing speed.

BACKGROUND OF THE INVENTION

The use of a small on chip memory area and high processing speed are essential for very accurately expressing a numerical value in a computer. To satisfy such limitations, a floating point type in which the data are separated into an exponent part and a mantissa part has been used. Early in the 1960s, data computation of a floating point expression, in a computer, was carried out by developing a software library function. The implementation provided low speed and occupied a large memory area. These problems had been overcome in some extent by the development of hardware adapting achievements in VLSI technology. However, improvements in processing speed still has a limitation that is essentially due to a lack of the parallel processing function of conventional logic gates. Accordingly, a multiplier circuit using a floating point expression also has a limitation in improving processing speed. Also, as the number of bits becomes larger, the number of gates increases greatly. Thus, the larger area on a chip occupied by a multiplier circuit having an increased number of gates is not economic.

SUMMARY OF THE INVENTION

It is an object of the present invention to provide a high-speed floating point multiplier circuit wherein the process speed is improved by using a neural network capable of providing a parallel process.

To achieve the above object, there is provided a floating point multiplier circuit for multiplying two k (=m+n) bit binary numbers, each of which consists of an m bit exponent part consisting of a 1 bit exponent sign and an (m−1) bit exponent, and an n bit mantissa part consisting of a 1 bit mantissa sign and an (n−1) bit mantissa.

The multiplier circuit includes a neural network multiplier for inputting in parallel an (n−1) bit mantissa of the two binary numbers to be multiplied, and outputting a 2(n−1) bit multiplication result, a binary point processing means for sequentially selecting (n−1) bits from the position of a first −1" obtained from the most significant bit among upper (n−1) bits of 2(n−1) bit multiplication result and outputting the selected (n−1) bits as a mantissa of the multiplication result of the multiplier circuit, and also generating an exponent value resulting from the change of the binary point of the mantissa obtained from the multiplication result, a first neural network adder/subtracter for inputting in parallel the (m−1) bit exponents of the two binary numbers, adding or subtracting two inputted (m−1) bit exponents according to a first control signal, and outputting an (m−1) bit operation result, a second neural network adder/subtracter for adding or subtracting for the (m−1) bit operation result outputted from the first neural network adder/subtracter and the exponent value generated in the binary point processing means according to a second control signal, and outputting an (m−1) bit operation result as an exponent of a multiplication result of the floating point type multiplier, and a control means for inputting 1 bit exponent signs, 1 bit mantissa sign and (m−1) bit exponents of the two binary numbers, the (m−1) bit operation result of the first neural network adder/subtracter, and the exponent value of the binary point processing means, and outputting the first and second control signals, and a 1 bit exponent sign and a 1 bit mantissa sign of the multiplication result of the floating point type multiplier.

BRIEF DESCRIPTION OF THE DRAWINGS

The above object and other advantages of the present invention will become more apparent by describing the preferred embodiment of the present invention with reference to the attached drawings, in which.

DETAILED DESCRIPTION OF THE INVENTION

Figure 1:
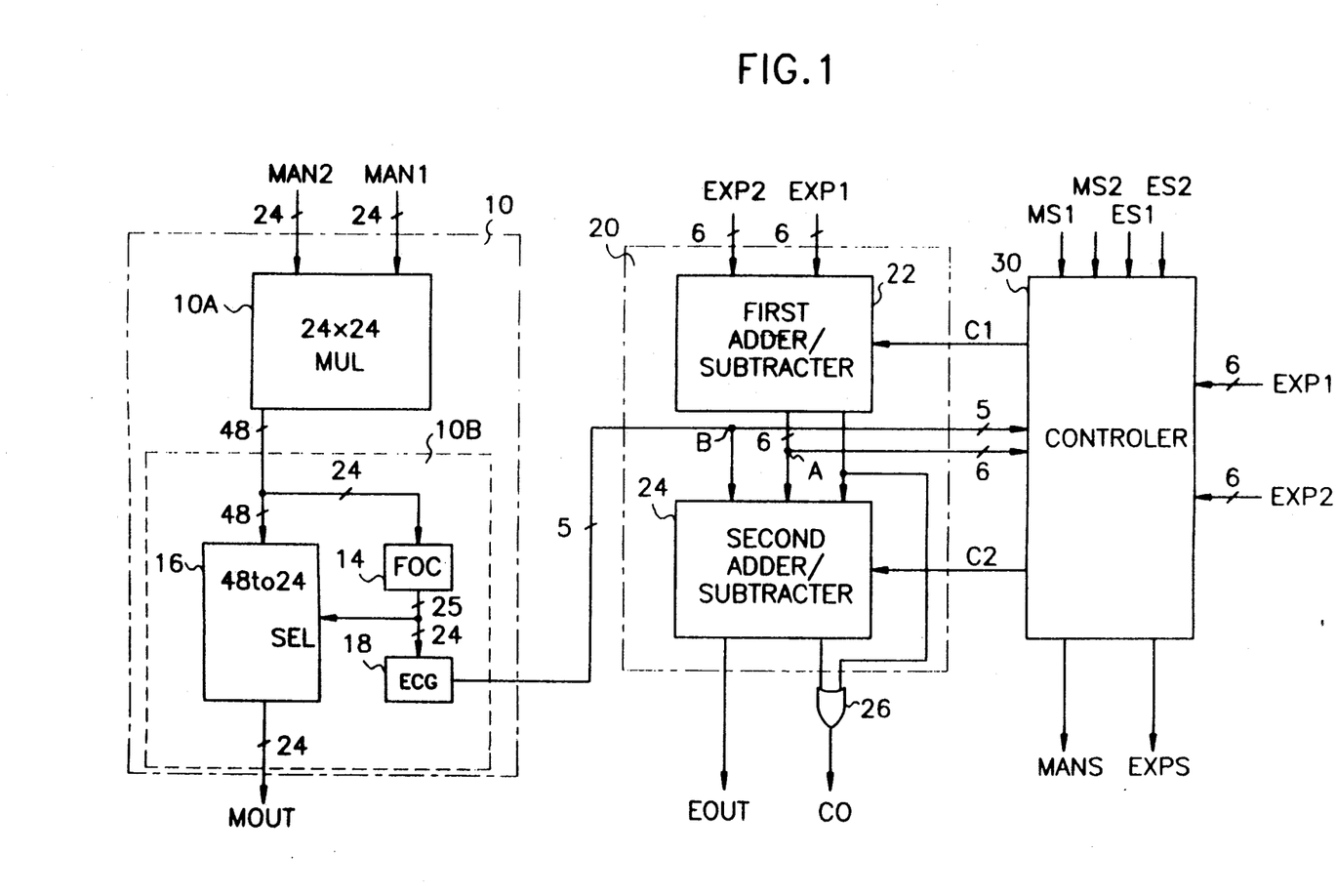
FIG. 1 is the block diagram of a high-speed floating point type multiplier circuit according to the present invention.

Referring to FIG. 1, a high-speed floating point multiplier circuit comprises in general a mantissa part arithmetic means 10, an exponent part arithmetic means 20, and a control means 30. The mantissa part arithmetic means 10 comprises a 24×24 neural network multiplier (MUL) 10A, and binary point processing means 10B which includes a first "1" checker (FOC) 14, an exponent code generator (ECG) 18 and a 48 to 24 line selector (SEL) 18. The exponent part arithmetic means 20 comprises a first 6 bit adder/subtracter 22 and a second 6 bit adder/subtracter 24. An OR gate 26 receives carries of the first and second adder/subtracter 22 and 24 and generates an overflow. The mantissa part arithmetic means 10 receives 24 bit mantissa MAN1 and MAN2 in parallel, and multiplies 24 bit mantissas MAN1 by 24 bits mantissa MAN2 to generate a 48 bit multiplication result in the 24×24 neural network multiplier 10A. The binary point processing means 10B receives the 48 bit multiplication result, and the upper 24 bit outputs of the 48 bit multiplication result are inputted in parallel to the FOC 14. The FOC 14 checks the existing position of the first "1", from the most significant bit (MSB) of the upper 24 bits. The FOC 14 has a 25 bit output Q0 to Q24 consisting of 24 bit outputs for outputting the existing position of the first "1" among the inputted upper 24 bits, and an 1 bit output for outputting the least significant bit when there exists no "1" among the upper 24 bits. The ECG 18 receives the 24 bit outputs Q1 to Q24 of the FOC 14 to encode into a binary number, thereby outputting the existing position of the first "1" as a 5 bit binary number $B_4B_3B_2B_1B_0$. The 5 bit binary number $B_4B_3B_2B_1B_0$ represents the exponent value obtained by shifting the binary point of the multiplication result of 24×24 MUL 12 to just before the MSB of the effective 24 bit mantissa part. The 48 to 24 SEL 16 receives a 48 bit output P0 to P47 of the 24×24 MUL 12, and sequentially selects from the existing position of the first "1" only 24 bits among the inputted 48 bits in response to 25 bit output Q0 to Q26 of the FOC 14, then outputs the most effective 24 bit mantissa MOUT. Accordingly, in the finally outputted 24 bit mantissa MOUT, a binary point is disposed just before the MSB.

The exponent part arithmetic means 20 receives in parallel the 6 bit exponents EXP1 and EXP2, to add or subtract in the first 6 bit adder/subtract 22. The first 6 bit adder/subtracter 22 adds or subtracts the exponents EXP1 and EXP2 according to the first control signal C1 of a control means 30. The second 6 bit adder/subtracter 24 adds or subtracts the 6 bit addition/subtraction result A of the first 6 bit adder/subtracter 22, a 1 bit carry, and the 5 bit exponent value B supplied from the mantissa part arithmetic means 10, according to the second signal C2 of the control means 30, and finally outputs the 6 bit addition or subtraction result to a 6 bit exponent EOUT.

The control means 30 receives 1 bit mantissa signs MS1 and MS2, 1 bit exponent sign ES1 and ES2, and 6 bit exponents EXP1 and EXP2 of the two binary numbers to be multiplied, and also receives the 6 bit addition/subtraction result A of the first 6 bit adder/subtracter 22, and the 5 bit output B of the ECG 18, and then outputs the first and second control signals C1 and C2 and a final 1 bit mantissa sign MANS, and an 1 bit exponent signal EXPS. When two mantissa signals MS1 and MS2 are equal, the final 1 bit mantissa sign MANS indicates "0", and indicates "1" in the other cases, thereby respectively indicating "+" or "−". When the exponent signs ES1 and ES2 of two exponents EXP1 and EXP2 are all "0" or when the exponent of "0" exponent sign is greater than that of "1" exponent sign, the exponent sign EXPS indicates "0". And when the two exponent signs ES1 and ES2 are all "1" or when the exponent of "1" exponent sign is greater than that of "0" exponent sign, the operation result A of the first 6 bit adder/subtracter 22 is compared with the 5 bit output B of the ECG 18, and the exponent sign EXPS indicates "1" if A is greater than B, or indicates "0" if A is smaller than B. The control signal C1 operates the first 6 bit adder/subtracter 22 as an adder when the two exponent signs ES1 and ES2 are equal, and as a subtracter when the signs are different. When two exponent signs ES1 and ES2 are all "1" or when the exponent of "1" exponent sign is greater than that of "0" exponent sign, the control means 30 compares the operation result A of the first 6 bit adder/subtracter 22 with the 5 bit output B of the ECG 16, and then the control signal C2 operates the second 6 bit adder/subtracter 24 as a subtracter only when A is greater than B, and as an adder in the other cases.

Figure 2:
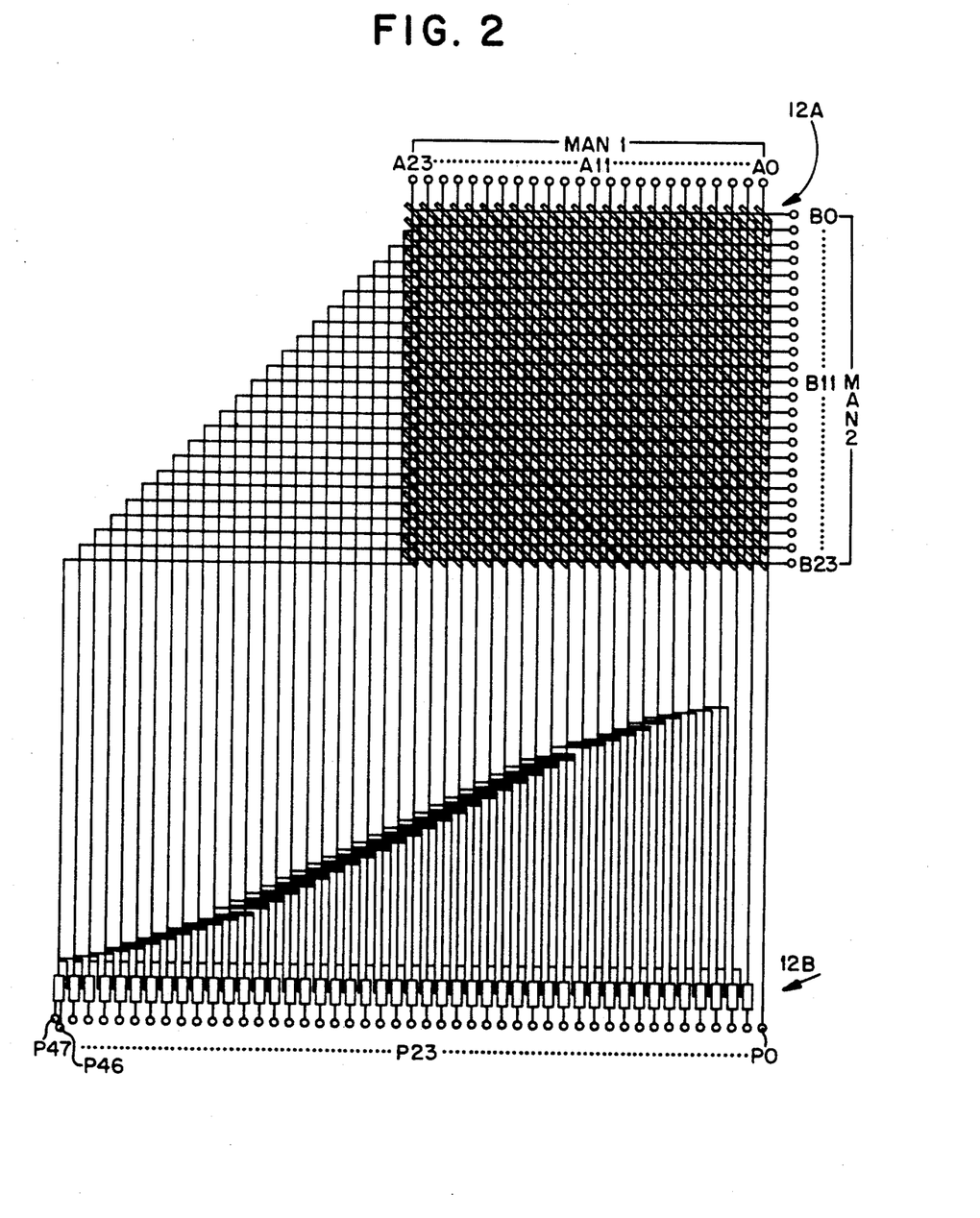
FIG. 2 illustrates a preferred embodiment of the 24×24 multiplier shown in FIG. 1.
Figure 3:
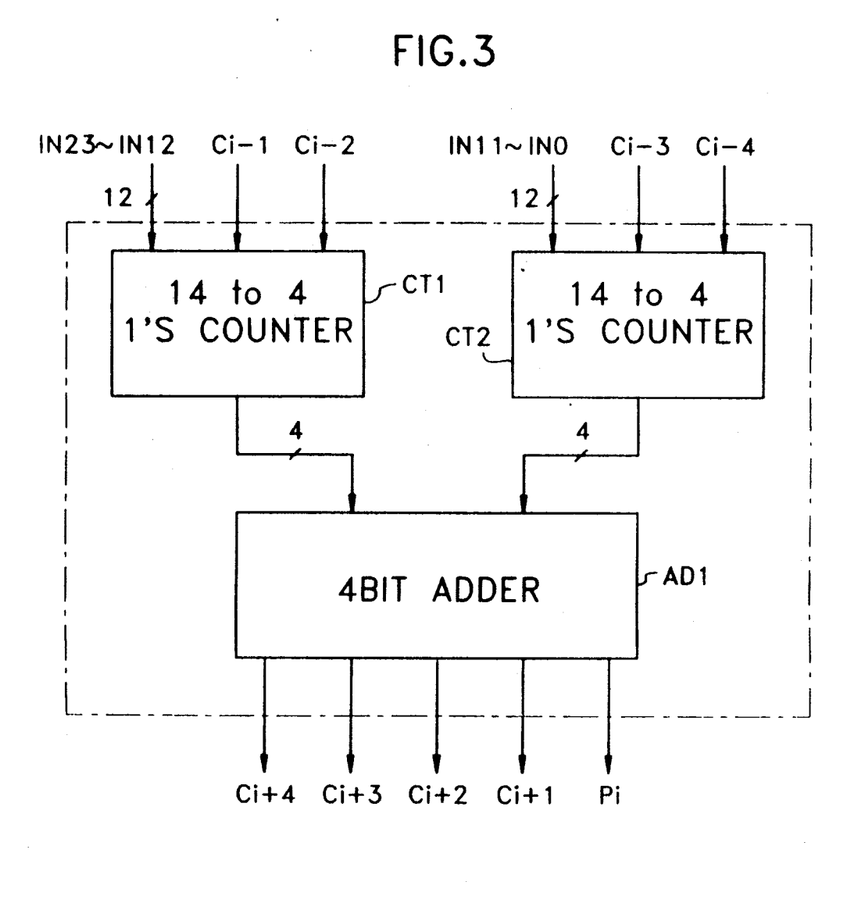
FIG. 3 is the block diagram of a preferred embodiment of the 1's counter shown in FIG. 2.

First of all, in a conventional multiplier, a basic cell is used as an AND gate, a full adder and a half adder. Whenever a bit of multiplication increases, the circuit is increased in two dimensions, so that the circuit becomes enormously large. Also, the effective speed is delayed because the adder circuit is processed in digital, and the operation speed is delayed due to the carry propagation. To solve the above problems, if a multiplier using a 1's counter as shown in FIG. 3 is designed, the area occupied by cells decreases, and the circuit area becomes small, to thereby achieve a compact and fast circuit. In a general multiplication algorithm, two numbers to be multiplied are orderly arranged, and then all partial products corresponding to the respective digits are added, and thereafter several generated output carries are added to the next stage. In FIG. 2, a multiplier is indicated by A23 to A0, a multiplicand is indicated by B23 to B0, and an output of the multiplier is indicated by P47 to P0. In the multiplication, the partial products corresponding to the respective digits of the multiplier and multiplicand, for instance, $A0 \times B0$ in the output P0, $A0 \times B1$ and $A1 \times B0$ in the output P1, and $A2 \times B0$, $A1 \times B1$, and $A0 \times B2$ in P2, etc. are obtained, in which each partial product consists of an AND gate. Accordingly, the output P0 of $A0 \times B0$ is outputted through an AND gate. Since the output P1 is the sum of $A0 \times B1$ and $A1 \times B0$, two output values of AND gates of respective partial products are inputted to a half adder to obtain P1 and to give the generated carry to the 1's counter of the next stage. Since the output P2 is the sum of the partial products of $A2 \times B0$, $A1 \times B1$, $A0 \times B2$ and the carry propagated from the lower stages, three output values of the AND gates of the respective partial products and the carry propagated from the lower stages are inputted to the 4 to 3 1's counter to obtain P2. In this manner, the carry from the lower stages becomes the input of the 1's counter to obtain the respective outputs. At this time, B3 when all inputs are assumed to be "1", to consider all the generation of carries in each case, the bit to be added by the greatest number of the inputs is the P23 stage, and the number of the total inputs is 28. Accordingly, in the 24×24 multiplier circuit, a 28 to 5 1's counter for counting the number of "1"s, 28 inputs in maximum are needed. When the number of "1"s of the partial products at the respective output stages and the carry from the lower stages are considered, the least 1's counter needed at the respective stages is calculated. The least counter needed at each terminal is designed to make a circuit, thereby simplifying the circuit and increasing the processing speed.

FIG. 2 illustrates one embodiment of a 24×24 neural network multiplier according to the present invention.

A neural network multiplier comprises the multiplier using a neural network disclosed in U.S. patent application Ser. No. 07/473633 which has been filed by this applicant and incorporated herein by reference. The neural network mutliplier mainly comprises a partial product means 12A for generating partial products of two mantissa MAN1 and MAN2, and 1's counters 12B for counting the number of 1's of partial products corresponding to the respective digits. In FIG. 2, the partial product means 12A showing the relationship between the respective partial products has an AND gate at each intersection of bits of two 24-bit mantissa MAN1 and MAN2. Accordingly, the partial products for one digit can be 1 in minimum to 24 in maximum. The respective 1's counters 12B, which are disposed in correspondence to the 47 digits except the least significant digit, are composed of 4 to 3 1's counter in minimum to 28 to 5 1's counter in maximum. Since there is generated a problem of fan-in of a CMOS inverter in the output neuron of the 1's counter, 1's counters having an input smaller than 15 bits are combined to construct a counter larger than the 16 to 4 1's counter in the present invention. For instance, a 28 to 5 1's counter consists of two 14 to 4 1's counters CT1 and CT2, and a 4 bit adder AD1.

Figure 4A:
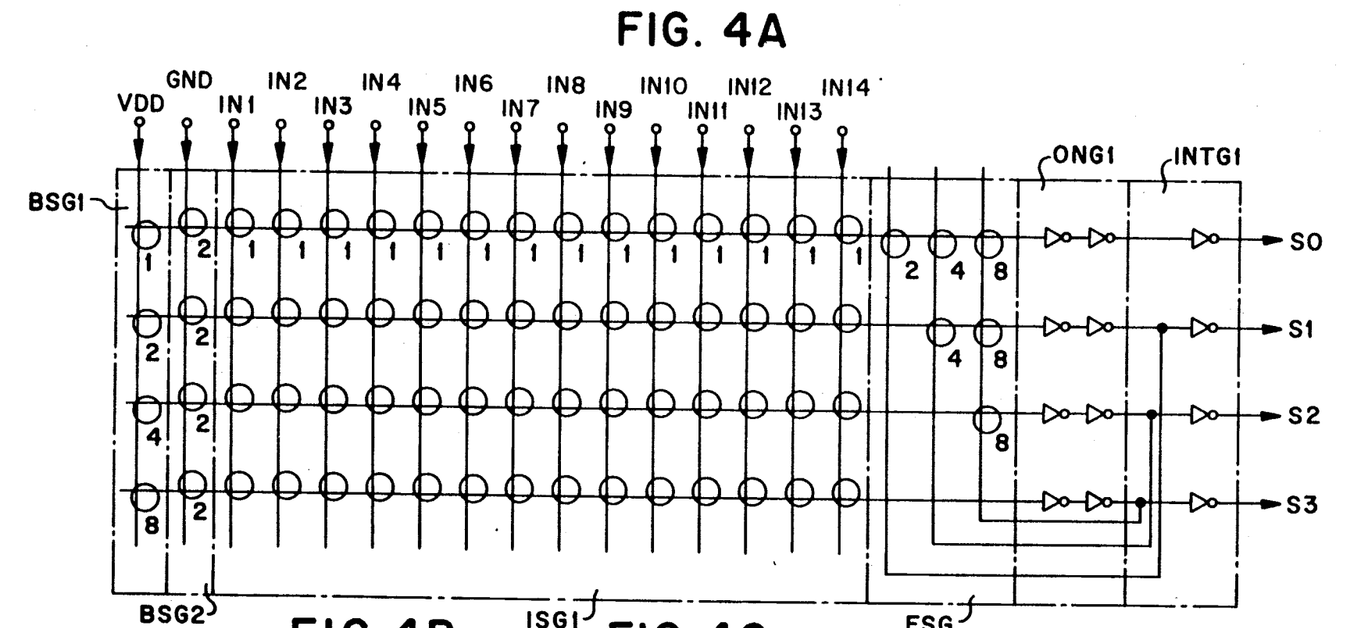
FIG. 4 is a circuit diagram of a preferred embodiment of the 14 to 4's counter shown in FIG. 3.
Figure 4B:
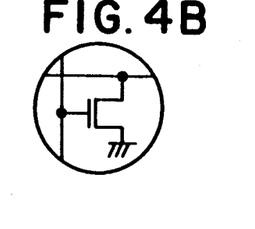
Figure 4C:
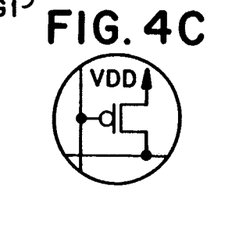

FIG. 4 is a circuit diagram of a preferred embodiment of the 14 to 4 1's counter shown in FIG. 3. In FIG. 3, the 1's counter counts the number of 1's from 14 inputs to output it as a 4 bit binary number. The 1's counter comprises four CMOS buffer amplifiers, i.e., a neuron group ONG1 for buffering an output; an inverter group INTG1 for inverting an output of each neuron; an input synapse group ISG, i.e., PMOS transistors for combining a first supply voltage $V_{DD}$ with a unit connecting strength to an output line at each intersection between input lines and output lines; a first bias synapse group BSG1, i.e., NMOS transistors for combining a second supply voltage (a ground voltage) with a connecting strength according to the weight of each output bit while the first supply voltage $V_{DD}$ is supplied; a second bias synapse group BSG2, i.e., PMOS transistors for combining the first supply voltage $V_o$ with 2 connecting strength to an output line while the second supply voltage (a ground potential) is supplied; and a feed-back synapse group FSG, i.e., NMOS transistors for combining the second supply voltage (a ground potential) with a connecting strength according to the weight of the upper bit outputs. Accordingly, the 1's counter constructed as the above has the output of S3, S2, S1, S0=1, 1, 1, 1 when all inputs IN1 to IN14 are "1", or the output of S3, S2, S1, S0=0, 0, 0, 0 when all inputs IN1 to IN14 are "0". In a similar manner, the output values for other inputs are determined. Here, the connecting strength of each synapse group is set by controlling the geometrical aspect ratio W/L of the MOS transistor, and when the connecting strength of a PMOS transistor is equal to that of an NMOS transistor, the NMOS transistor is set to be superior.

Figure 5:
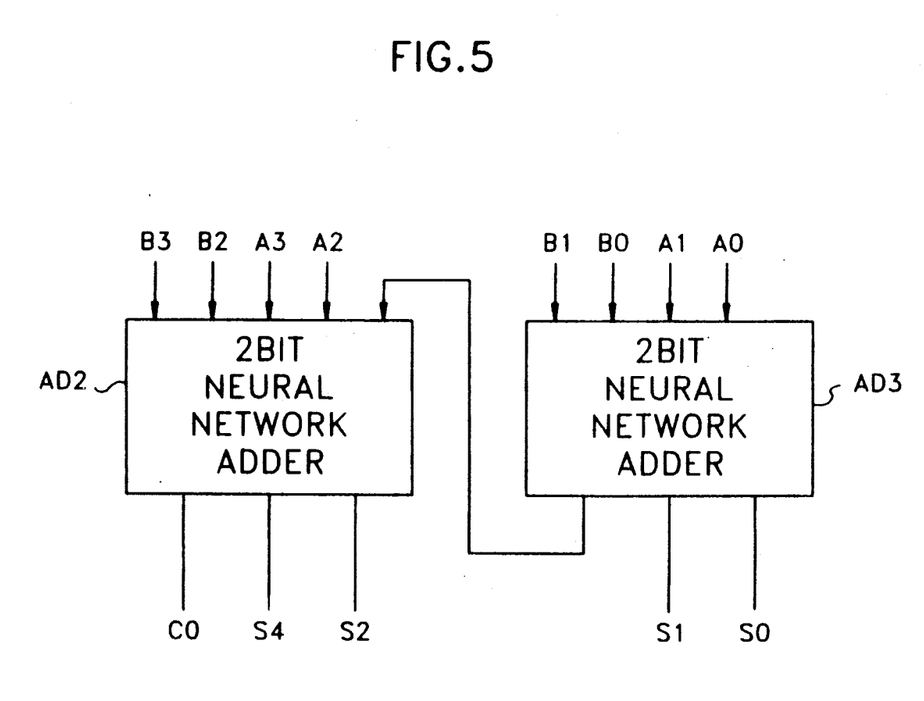
FIG. 5 is the block diagram of a preferred embodiment of the 4-bit adder shown in FIG. 3.

As shown in FIG. 5, a 4 bit adder AD1 of FIG. 3 comprises the adder using a neural network disclosed in U.S. patent application Ser. No. 07/473654 which has been previously filed by this applicant and incorporated herein by reference. That is, the 4 bit adder AD1 consists of two 2 bit neural network adders AD2 and AD3.

Figures 6A, 6B, 6C:
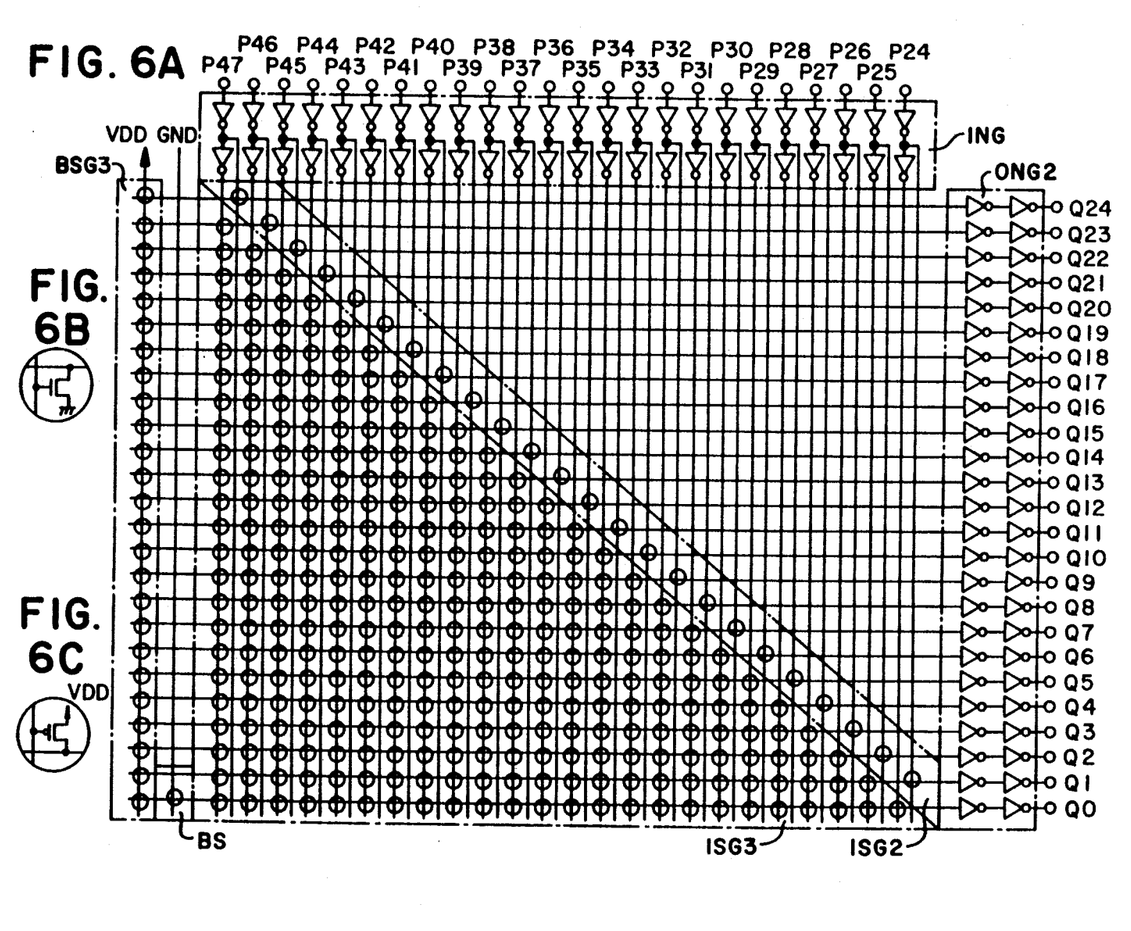
FIG. 6 is a circuit diagram of a preferred embodiment of the FOC shown in FIG. 1.

FIG. 6 is a circuit diagram of a preferred embodiment of the first "1" checker FOC shown in FIG. 1. In FIG. 1, the FOC 14 receives the upper 24 bit outputs of the 24×24 multiplier 12 and outputs a "1" for the output corresponding to the existing position of the first 1 among the inputs and a "0" for the remaining outputs. When all inputs are "0", "1" is outputted to the 25th output bit. The FOC 14 comprises 24 CMOS buffer amplifiers, i.e., an input-side neuron group ING for buffering the inputs P24 to P47; a first input synapse group ISG2, i.e., PMOS transistors for connecting the first supply voltage $V_{DD}$ with a unit weight connecting strength to 24 lines except the lowest significant bit line of 25 lines according to an inverted output of each input-side neuron; a second input synapse group ISG3, i.e., NMOS transistors for respectively connecting the second supply voltage (a ground potential) with a unit weight connecting strength to 24 lines except the most significant bit line of 25 lines according to the non-inverted output of the respective input-side neurons; a first bias synapse group BSG3, i.e., NMOS transistors for respectively connecting the second supply voltage (a ground potential) with a unit weight connecting strength to the 25 lines while the first power supply voltage $V_{DD}$ is supplied; a second bias synapse BS, i.e., a PMOS transistor for connecting the first supply voltage $V_{DD}$ with a unit weight connecting strength to the least significant bit line while the second supply voltage (a ground potential) is supplied; and 25 CMOS buffer amplifiers, i.e., an output-side neuron group ONG2 which are excited or inhibited according to the difference between the connecting strength of the first supply voltage $V_o$ connected to the respective lines and that of the second supply voltage (a ground voltage) connected to the respective lines.

Accordingly, when the inputs P24 to P47 are 000000000001110010001100, the outputs Q0 to Q24 become 0000000000010000000000000, and when the inputs P24 to P27 are all "0", the outputs Q0 to Q24 become 0000000000000000000000001. In the same manner, the output values for other inputs are determined. Here, the NMOS and PMOS transistors in a synapse group are designed to be set by controlling the geometric aspect ratio W/L, similarly to the above-described 1's counter, and when the connecting strength of the PMOS transistor is equal to that of the NMOS transistor, the PMOS transistor is designed to be superior.

Figure 7:
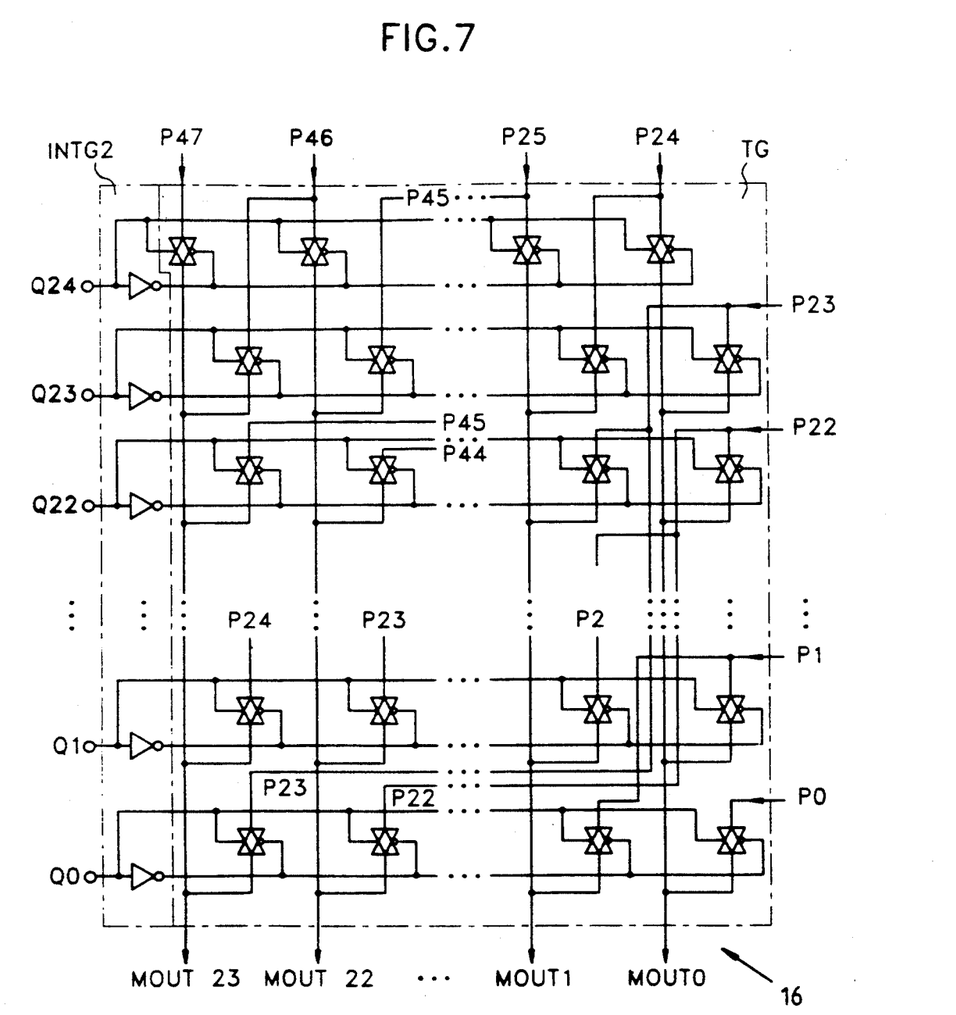
FIG. 7 is the circuit diagram of a preferred embodiment of the 48 to 24 line selector shown in FIG. 1.

FIG. 7 is a circuit diagram of a preferred embodiment of the 48 to 24 line selector shown in FIG. 1. Referring to FIG. 7, a line selector 16 receives the upper 24 bits of a 48 bit output of MUL 12 through the input terminals P24 to P47 arranged in the row direction, and receives the lower 24 bits through the input terminals P0 to P23 in the column direction. And the 25 bit outputs Q0 to Q24 of the FOC 14 in FIG. 6 are inputted to the control input terminals. The line selector 16 comprises a transmitting gate group TG arranged in a 24×25 matrix and an inverter group INTG2 for generating each complement signal of an inputted control signal. Each input of inputs P0 through P47 is combined with the respective corresponding output terminals through transmitting gates arranged on the diagonal line running from the right upper to the left lower.

Consequently, 25 transmitting gates on each column receive the respective bits in such a manner that the bit for the uppermost gate of the first column is the most significant bit of the multiplier and the bit for the second upper gate of the first column has one digit less than the digit of the most significant bit and the bit for the third upper gate thereof has two digits less than the digit of the most significant bit and so on, and the bit for the uppermost gate of the second column has one digit less than the digit of the most significant bit and the bit for the second upper gate of the second column has two digits less than the digit of the most significant bit and the bit for the uppermost gate of the third column has two digits less than the digit of the most significant bit and so on.

The transmitting gates arranged in the direction of row are simultaneously switched by a control input and a complement input thereof. That is, when the control input is "0", all the transmitting gates in a row become turned OFF, and when control input is "1", the all transmitting gates in a row become turned ON. Accordingly, only the 24 transmitting gates arranged on the row receiving a "1" output of the FOC 14 become ON to sequentially select only 24 bits beginning with the first "1" bit among the 48 bit input. For instance, when the control input Q23 is "1", the respective 24 transmitting gates arranged on the second row become turned ON to select the inputs P46 to P23.

Figure 8A:
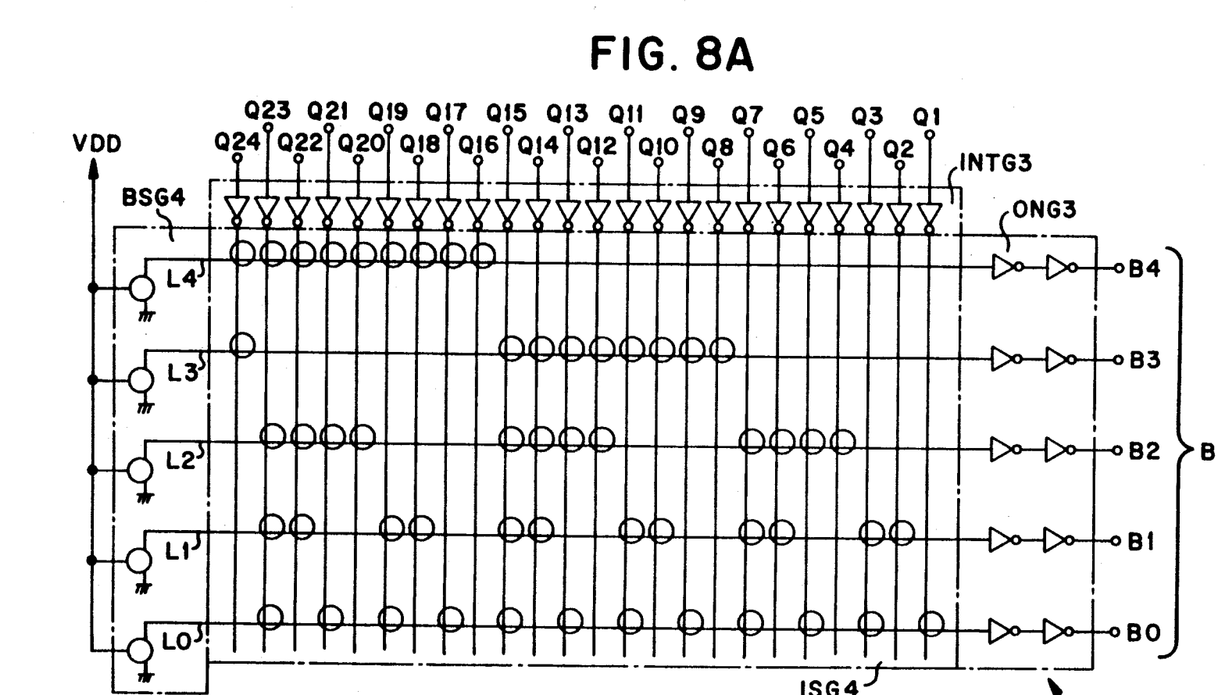
FIG. 8 is a circuit diagram of a preferred embodiment of the ECG shown in FIG. 1.
Figure 8B:
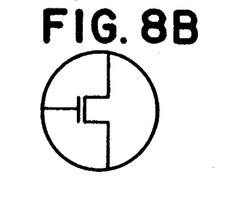
Figure 8C:
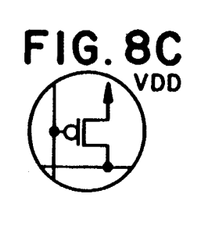

FIG. 8 is a circuit diagram of a preferred embodiment of the exponent code generator ECG shown in FIG. 1. The ECG 18 receives in parallel the 24 bits except the least significant bit among 24 bits of the FOC 14 in FIG.

1, and encodes the inputted 24 bits to generate an exponent value in the form of a 5 bit binary number according to the shift of the binary point of the mantissa. The ECG 18 comprises an inverter group INTG3 for inverting the 24 bit input; an input synapse group ISG4, i.e., PMOS transistors for respectively connecting the first supply voltage $V_{DD}$ with a unit weight connecting strength to 5 lines according to the output of each input side inverter; a bias synapse group BSG4, i.e., NMOS transistors for respectively connecting the second supply voltage GND with a unit weight connecting strength to the above five lines L0 to L4 while the first supply voltage $V_{DD}$ is supplied; and five CMOS buffer amplifiers, i.e., an output-side neuron group ONG3 which are excited or inhibited according to the difference of the connecting strength of the first supply voltage $V_{DD}$ connected to the respective lines and that of the second supply voltage GND connected to the respective lines. Accordingly, a 5 bit binary number corresponding to the position of a "1" among the 24 bit input is outputted. For instance, when "1" exists at the 15th position from the least significant bit, only the output of the 15th inverter is "0", and only the PMOS transistors connected to the output of the 15th inverter are turned on. Accordingly, each PMOS transistor is turned on only for 4 lines L0 to L3 except the line L4 of five lines L0 to L4, , so that the connecting strength of the second supply voltage GND through an NMOS transistor is compared with that of the first supply voltage $V_{DD}$ through a PMOS transistor. When the connecting strength of the first supply voltage is equal to that of the second supply voltage, the conductance of the PMOS transistor is superior to that of the NMOS transistor. Thus, the outputs B0 to B3 become 1111 and the output B4 keeps a "0" state. Thus, the exponent value is encoded into the binary number of 01111 to be generated.

Figure 9:
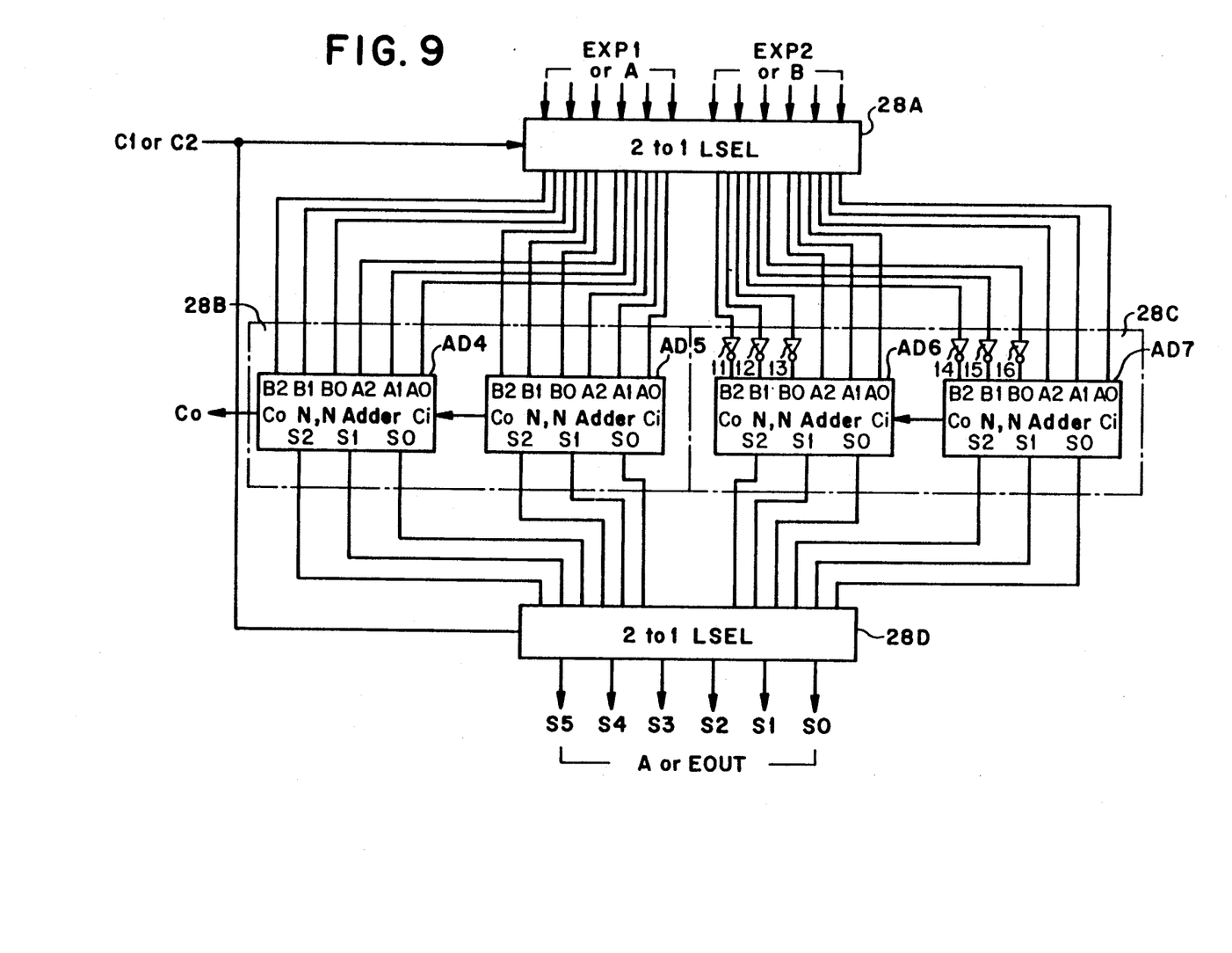
FIG. 9 is the block diagram of a preferred embodiment of the adder/subtracter shown in FIG. 1.

FIG. 9 is a circuit diagram of a preferred embodiment of the first and the second adder/subtracters shown in FIG. 1. Referring to FIG. 9, the respective 6 bit adder/subtracters 24 and 24 respectively comprise the first and the second 2 to 1 lone selector 28A and 28D, a 6 bit adder 28B and a 6 bit subtracter 28C. The first 2 to 1 line selector 28A selectively supplies the 6 bit exponents EXP1 and EXP2 to the 6 bit adder 28B or the 6 bit subtracter 28C according to the control signal C1 or C2. The 6 bit adder 28B consists of two 3 bit neural network adders AD4 and AD5, and the 6 bit subtracter 28C consists of tow 3 bit neural network adders AD6 and AD7, and 6 CMOS inverters I1 to I16 for inverting the 6 bit subtrahends. The second 2 to 1 line selector 28D selectively outputs each output of the 6 bit adder 28B or 6 bit subtracter 28C according to the control output C1 or C2. The carry output C0 of the 6 bit adder 28B is supplied to the OR gate 26 shown in FIG. 1.

As described above, in the floating point type multiplier circuit according to the present invention, the means for operating the exponent and mantissa is designed with the parallel arrangement of the PMOS and NMOS transistors using the concept of the neural network, thereby realizing a fast operation by transmitting in parallel the input and the output. Also, the structure of the circuit is simpler than those of conventional logic gates.

The preferred embodiment of the present invention has been described for the respective partial circuits according to an arbitrary bit value, but it should be noted that it can be modified within the scope of the invention as set forth in the claims.

What is claimed is:

1. A high-speed floating point multiplier circuit for multiplying two $k(\times m+n)$ bit binary numbers to generate a third k bit binary number, each binary number having an m bit exponent portion consisting of a 1 bit exponent sign portion and an $(m-1)$ bit exponent portion, and an n bit mantissa portion consisting of a 1 bit mantissa sign portion and an $(n-1)$ bit mantissa portion, said circuit comprising:

a multiplier for inputting in parallel the $(n-1)$ bit mantissa portions of each of said two binary numbers and outputting a $2(n-1)$ bit multiplication result in response thereto;

binary point processing means for sequentially selecting $(n-1)$ bits following a first non-zero most significant bit position, said first non-zero most significant bit position being selected from one of the higher ordered $(n-1)$ bits of said $2(n-1)$ bit multiplication result, the sequentially selected $(n-1)$ bits defining the mantissa portion of said third binary number, and said binary point processing means generating an exponent value defining an exponent portion of said $2(n-1)$ bit multiplication result in response to said first non-zero most significant bit position;

a first adder/subtracter for inputting in parallel the $(m-1)$ bit exponent portions of said two binary numbers and outputting an $(m-1)$ bit operation result in response to a first control signal and said $(m-1)$ bit exponent portions;

a second adder/subtracter for receiving the $(m-1)$ bit operation result from said first adder/subtracter, the exponent value generated by said binary point processing means and a second control signal, and outputting an $(m-1)$ bit exponent result defining an exponent portion of said third binary number in response thereto; and control means for inputting 1 bit exponent sign portions of said two binary numbers for generating said first control signal, and inputting 1 bit mantissa sign portions and $(m-1)$ bit exponent portions of said two binary numbers, the $(m-1)$ bit exponent result from said first adder/subtracter, and the exponent value generated by said binary point processing means, and outputting in response thereto the second control signal, and a 1 bit exponent sign portion and a 1 bit mantissa sign portion defining the respective portions of said third binary number.

2. A high-speed floating point multiplier circuit as claimed in claim 1, wherein said multiplier comprises:

a plurality of partial products means, each partial product means providing a bit-by-bit product of a bit of the $(n-1)$ mantissa portion of a first of said two binary numbers and a bit of the $(n-1)$ mantissa portion of a second of said two binary numbers; and $2(n-1)-1$ parallel connected 1's counters arranged to receive and add selected ones of said bit-by-bit products and selected carry signals from a respective lower 1's counter, each 1's counter providing a 1 bit sum output, corresponding to a respective digit of the $(2(n-1)-1)$ most significant positions of said $2(n-1)$ bit multiplication result, and a carry bit to a higher order 1's counter, the least significant bit position of said $2(n-1)$ bit multiplication result being defined by one of a corresponding bit-by-bit product.

3. A high-speed floating point multiplier circuit as claimed in claim 2, each of said 1's counters receiving a plurality of one digit inputs, each one digit input corresponding to one of the bit-by-bit products and carry signals inputted thereto, and each 1's counter comprising a first number of output lines for outputting a binary 1's arithmetic sum, wherein each output line comprises:
   a plurality of PMOS transistor interconnections, each for receiving a first voltage and a respective one digit input and outputting a first signal onto the respective output line in response thereto;
   a plurality of NMOS transistor interconnections, each for receiving a second voltage and a preinverted output of one of said plurality of output lines and outputting a second signal onto said respective output line, said respective output line being different from said one of said plurality of output lines providing said preinverted output thereto; and
   a bias transistor interconnection pair for providing a first bias current onto the respective output line, each PMOS transistor interconnection, each NMOS transistor interconnection and each bias transistor interconnection pair being preassigned a current driving capacity in accordance with the position of the interconnection along the respective output line.

4. A high-speed floating point multiplier circuit as claimed in claim 1, wherein said binary point processing means comprises:
   a first ones checker for receiving an (n−1) bit input from said multiplier and generating an n bit output having a single non-zero bit position corresponding to the bit position of the most significant non-zero bit position of said (n−1) bit input and outputting a "0" for the rest of the outputs of the n bit output, and generating a "1" at the least significant bit position of the n bit output when none of the (n−1) bit inputs are "0",
   a 2(n−1) to (n−1) selector for receiving a 1(n−1) bit input from said multiplier and the n bit output from said first ones checker and generating an (n−1) bit output corresponding to the next (n−1) lower order bits associated with the non-zero bit position of said n bit input; and
   an exponent code generator for inputting the most significant (n−1) bits of the n bit output from said first ones checker and outputting said exponent value in response thereto.

5. A high-speed floating point multiplier circuit as claimed in claim 4, wherein said first ones checker comprises:
   (n−1) parallel input buffer amplifiers for receiving said (n−1) bits from said multiplier, and each input buffer amplifier providing an inverted output and a non-inverted output of each corresponding bit of said (n−1) bits;
   n parallel output buffer amplifiers for providing an n bit output;
   (n−1) PMOS transistors for forming interconnections between an inverted output of each of said input buffer amplifiers and a corresponding one of (n−1) output buffer amplifiers associated with the (n−1) most significant bits of said n bit output;
   a plurality of NMOS transistors selectively arranged for forming interconnections between a non-inverted output of said input buffer amplifiers and corresponding output buffer amplifier;
   n parallel bias NMOS transistors for providing a first bias current to each respective output buffer amplifier; and
   a bias PMOS transistor for providing a second bias current to the output buffer amplifier outputting the least significant bit of the n bit output, wherein said first bias current, said second bias current, and excited interconnections are provided to generate a bit output at each respective output amplifier in response thereto.

6. A high-speed floating point multiplier circuit as claimed in claim 4, said 2(n−1) to (n−1) selector comprising transmitting gates arranged in the form of an n row by (n−1) column matrix, wherein:
   each of n rows receiving a corresponding position bit of an n bit input from said first ones checker, the uppermost row of said matrix for transmitting each of higher order (n−1) bits of the 2(n−1) bit multiplication result from said multiplier to a corresponding column output lone connected thereto; and
   each subsequent row of transmitting gates being arranged such that the subsequent (n−1) bits of said 2(n−1) bits, following the highest order bit of the preceding row, are also connected to transmit bit information onto the corresponding column output line, the lowermost row in said matrix connecting all the lower order (n−1) bits of said 2(n−1) bits, wherein only one row can transmit information onto each of the column output lines in response to the non-zero bit position of said n bit input from said first ones checker.

7. A high-speed floating point multiplier circuit as claimed in claim 4, wherein said exponent code generator for generating an exponent value comprises:
   (n−1) parallel inverters for receiving the higher ordered (n−1) bits of the n bit output of said first ones checker;
   a plurality of parallel output buffer amplifiers each for providing a corresponding bit output of the exponent value;
   a plurality of PMOS transistors selectively arranged for forming interconnections between each inverter and corresponding output buffer amplifiers; and
   a plurality of NMOS transistors for providing a bias current to each corresponding output buffer amplifiers, wherein said bias current and excited interconnections are provided to generate an exponent value bit output at each respective output buffer amplifier in response thereto.

8. A high-speed floating point multiplier circuit as claimed in claim 1, wherein each of said first adder/subtracter and said second adder/subtracter comprises:
   an adder;
   a subtracter;
   a first line selector for selectively supplying two (m−1) bit inputs to said adder and said subtracter in response to the respective control signal; and
   a second line selector for selectively outputting the outputs of said adder and said subtracter in response to said respective control signal.

* * * * *